United States Patent [19]

Newton

[11] 4,383,369
[45] May 17, 1983

[54] KNIFE ALIGNMENT SENSOR

[76] Inventor: Herbert H. Newton, 1900 Emerson Ave., Louisville, Ky. 40205

[21] Appl. No.: 368,810

[22] Filed: Apr. 15, 1982

[51] Int. Cl.³ .............................................. B27G 23/00
[52] U.S. Cl. ................................. 33/185 R; 33/169 C
[58] Field of Search ............ 33/185 R, 169 C, 172 D, 33/181 R

[56] References Cited

U.S. PATENT DOCUMENTS

| T901,004 | 8/1972 | Schmid | 33/185 R |
|---|---|---|---|
| 1,040,715 | 10/1912 | Mann | 33/169 C |
| 2,417,148 | 3/1947 | Wright | 33/174 R |
| 2,700,993 | 2/1955 | Pence | 33/185 R |
| 2,747,291 | 5/1952 | Snyder | 33/185 R |
| 2,891,317 | 6/1959 | Wood | 33/185 R |
| 3,135,056 | 6/1964 | Sleeter | 33/185 R |
| 3,200,507 | 8/1965 | Rivard | 33/185 R |
| 3,370,356 | 2/1968 | Jend | 33/169 C |
| 3,470,618 | 10/1969 | Richer | 33/169 C |
| 3,499,226 | 3/1970 | Hopkins | 33/169 C |
| 3,724,084 | 4/1973 | McNeece | 33/185 R |
| 3,903,609 | 9/1975 | Brown | 33/185 R |

FOREIGN PATENT DOCUMENTS 554393  7/1943  United Kingdom .............. 33/169 C

*Primary Examiner*—Willis Little
*Attorney, Agent, or Firm*—Cushman, Darby & Cushman

[57] ABSTRACT

The present invention provides an inexpensive device particularly designed so as to permit easy, accurate adjustment of the working edge, edges, surface or surfaces of the movable head on any of a wide variety of mill and shop tools. A housing encloses a battery and number of spaced electrical contacts, so arranged that a circuit through a light-emitter and a sound-emitter is made only when one of the electrical contacts engages a fixed-location site on the tool and another engages a working edge or surface. In this way the working edge(s) or surface(s) may be adjusted so as to just touch the contact which sets-off the light and sound. For versatility there is more than one of these working edge or surface-engaging contacts, variously located on the device for alternative use. A special housing shape is disclosed as is the use of permanent magnets for holding the device at a uniform location for certain uses.

11 Claims, 7 Drawing Figures

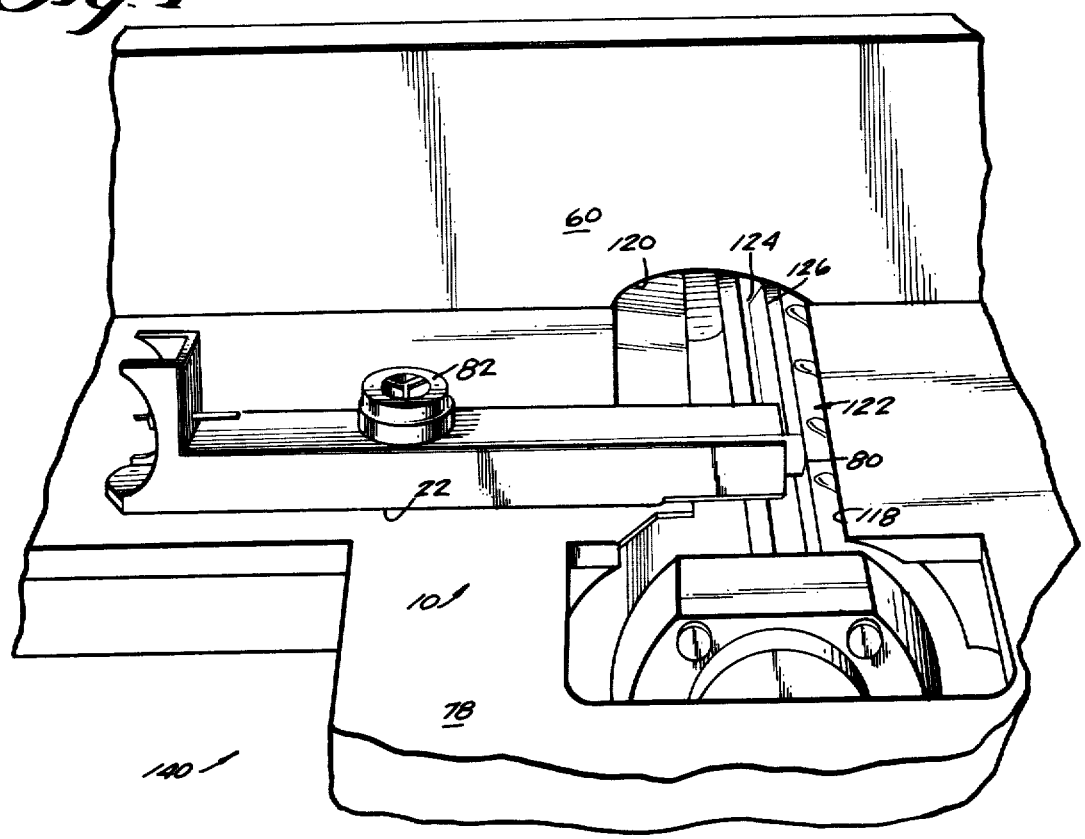
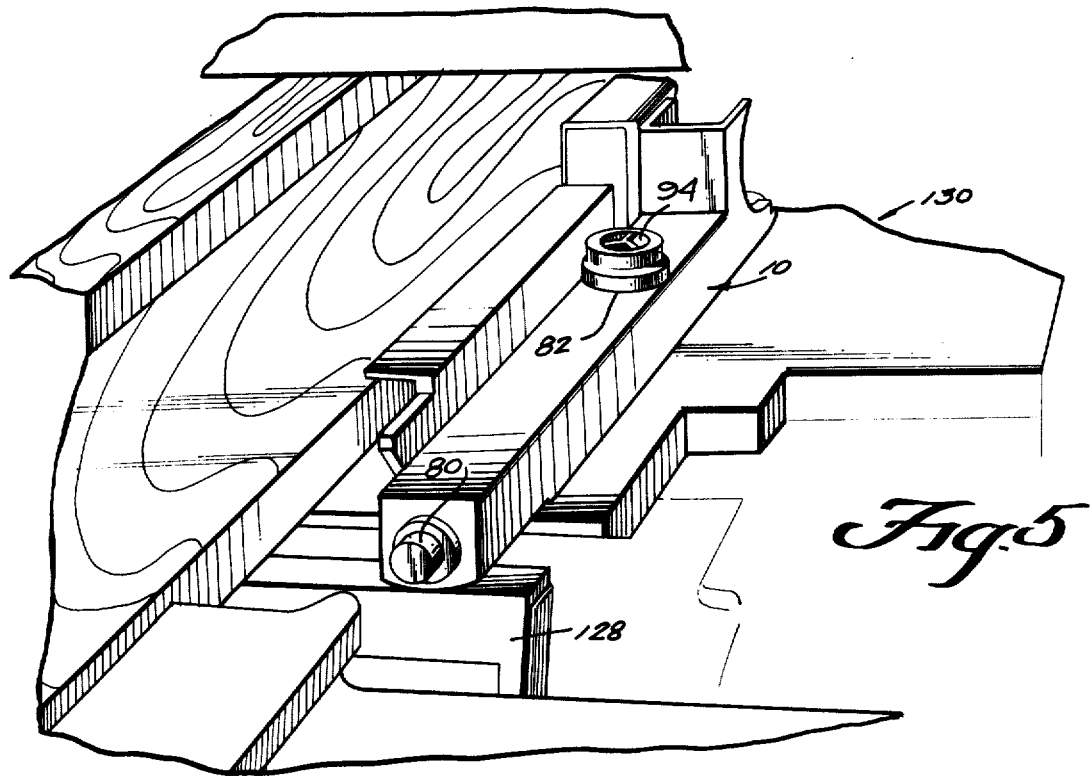

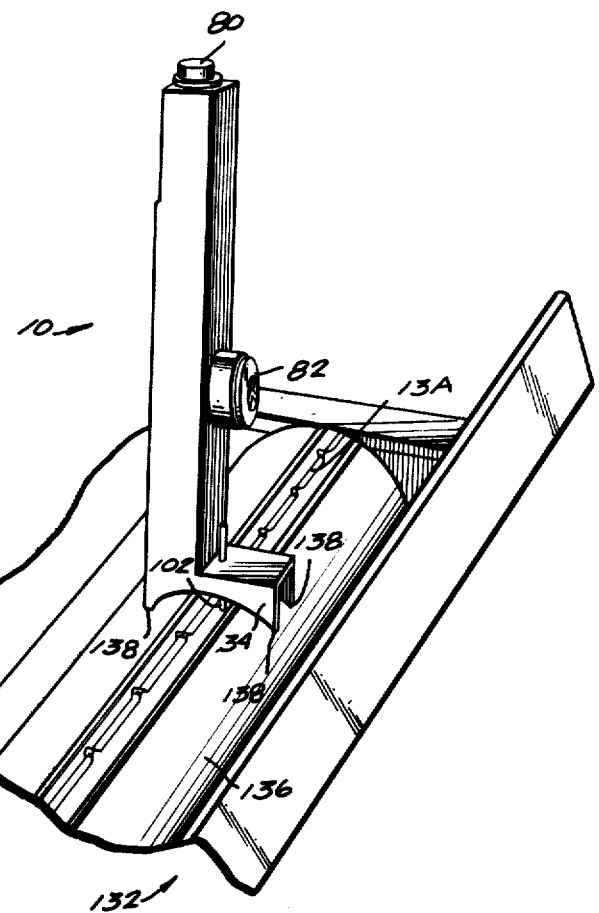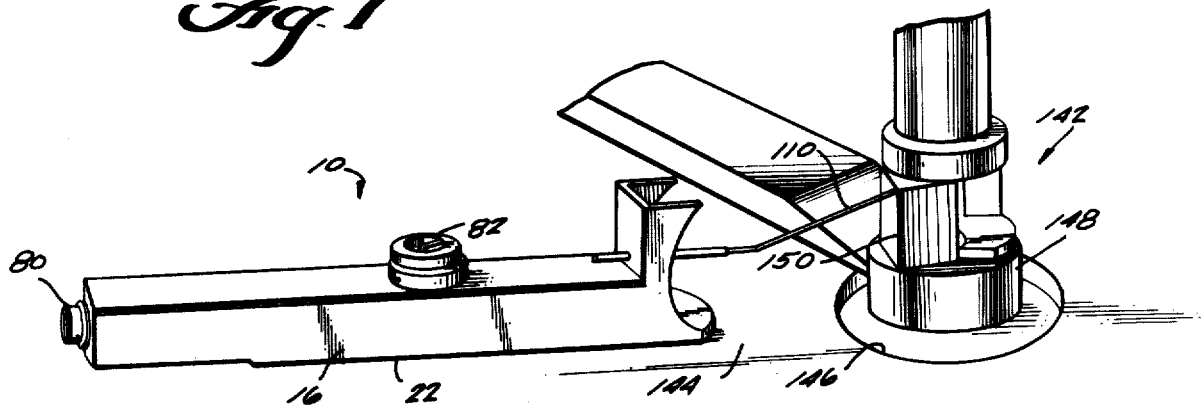

KNIFE ALIGNMENT SENSOR

BACKGROUND OF THE INVENTION

Many types of woodworking tools, milling tools, shop equipment and the like have as a common characteristic a head that is rotated and/or reciprocated or orbited about a path, while it has at least one cutter or other knife-like or abrading-type working surface or working edge means adjustably attached to the head. Most generally, each working surface or edge means is mounted for compound-direction adjustment relative to the head. Accordingly, accurate adjustment generally involves something more than, for instance, merely turning one crank to move an edge radially inwards or outwards by a uniform amount along the whole length of the cutting edge. In fact, means for compound-directional adjustment is provided particularly because it is needed in order to uniformly position the working edge or surface. That is, for example, on a machine where it is possible to move a cutting edge radially outwards, there often may be a means for adjusting the amount of radial extension of one end of the cutting edge relative to the other, in order to prevent the cutting edge, when the head is rotated, from cutting too deeply into the work at one end and/or not deeply enough into the work at the opposite end.

One can dream all too easily of wanting exotic devices provided on one's tools of this sort, for instance electric-eye or laser-type devices that one could use for automatically adjusting the working edges or surfaces by pushing some buttons or entering a program into a controller. And certainly it would be feasible to go to the expense of such solutions for some expensive industrial applications, but for the widespread practical situation adjustment has been more a matter of cut and try, of naked-eye adjustments made with the aid of gauging blocks, calipers, rulers, squares and other jigs.

SUMMARY OF THE INVENTION

The present invention provides an inexpensive device particularly designed so as to permit easy, accurate adjustment of the working edge, edges, surface or surfaces of the movable head on any of a wide variety of mill and shop tools. A housing encloses a battery and number of spaced electrical contacts, so arranged that a circuit through a light-emitter and a sound-emitter is made only when one of the electrical contacts engages a fixed-location site on the tool and another engages a working edge or surface. In this way the working edge(s) or surface(s) may be adjusted so as to just touch the contact which sets-off the light and sound. For versatility there is more than one of these working edge or surface-engaging contacts, variously located on the device for alternative use. A special housing shape is disclosed as is the use of permanent magnets for holding the device at a uniform location for certain uses.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings:

FIG. 4 is a perspective view of the device being used for aligning the knives of a common type of woodworking jointer;

FIG. 5 is a perspective view of the device being used for aligning the knives of a common type of woodworking moulder;

FIG. 6 is a perspective view of the device being used for aligning the knives of a common type of woodworking planer; and FIG. 7 is a perspective view of the device being used for aligning the knives of a common type of woodworking shaper.

DETAILED DESCRIPTION

Figure 1:
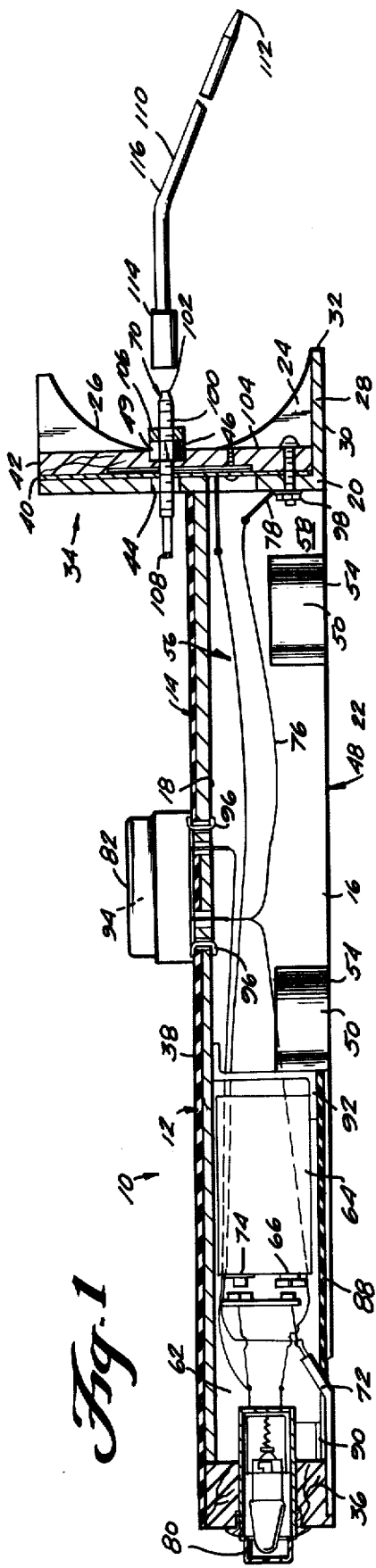
FIG. 1 is a vertical longitudinal sectional view through the device as it lies in a horizontal condition, with the probe in place and the contact- and magnet-bearing side of the housing directed downwards.

The device 10 includes a housing 12 that comprises a downwardly-open squared-off U-shaped channel member providing a body 14 having opposite legs or sidewalls 16 and a back or top 18. The forward end of the body channel 14 is closed by an end wall 20 that extends from the lower edges 22 of the sidewalls 16 to a level considerably above the outside of the back 18. Side plates 24 extend forwards from the sidewalls 16 at the opposite side edges of the end wall 20 and extend upwards the full height of the end wall 20. The two side plates have correspondingly shaped forwardly concave arcuate end surfaces 26. Between the side plates 24 at the bottom is a show plate 28, having a lower surface 30 that is coplanar with the lower edges 22 of the sidewalls 16. Whereas the end surfaces 26 are concave forwards about a horizontal transversally extending surface, the forward end surface 32 of the shoe plate 28 is forwardly convex about a medially-located vertical axis. The forward end fixture 34 constituting the elements 20 and 24 thru 32 may be separately fabricated e.g. by the use of bolt and nut 98 joined as a whole to the body channel 14. Typically the housing main portion constituted by the body channel 14 and end fixture 34 is made of an electrically conductive material e.g. aluminum.

The rear end of the body channel 14 is shown closed by a block 36 of electrically insulative material, e.g. a block of wood. The sidewalls 16 of the channel, including the sides of the electrically insulative rear end wall 36, and the top wall 18 are shown covered with a layer of electrically insulative material 38, for instance Formica-brand decorative pressurized laminate. A layer and block of similar electrically insulative material 40, 42 is shown juxtaposed upon all of the front surface of that portion of the front end wall 20 of the housing that lies between the sideplates 24 and above the shoe plate 28 of the fixture 34.

Midway up the forward end fixture 34, at a level just above the level of the back 18, a set of medially located openings 44, 46 is provided coaxially through the forward end wall 20 and the layer and block 40, 42, the openings 46 being somewhat larger in diameter than the opening 44. An internally threaded nut 49 made of insulative plastic material is embedded in the opening 46 in the block 42 and, for instance cemented in place.

At two intermediate sites along the length of the downwardly-open mouth 48 of the housing, circular disk-shaped, flat bottomed, permanent magnets 50 are potted (at 52) in place across the full width of the mouth, so as to have their lower surfaces 54 flush with the lower edges 22 and lower surface 30. The magnets 50 are not as tall as the interior cavity 56 of the housing, so there is empty space over the top of each of them within the cavity 56. Nevertheless, the magnets 50 sort-of divide the cavity 56 into three portions, a forward portion 58, an intermediate portion 60 and a rear portion 62.

Figure 3:
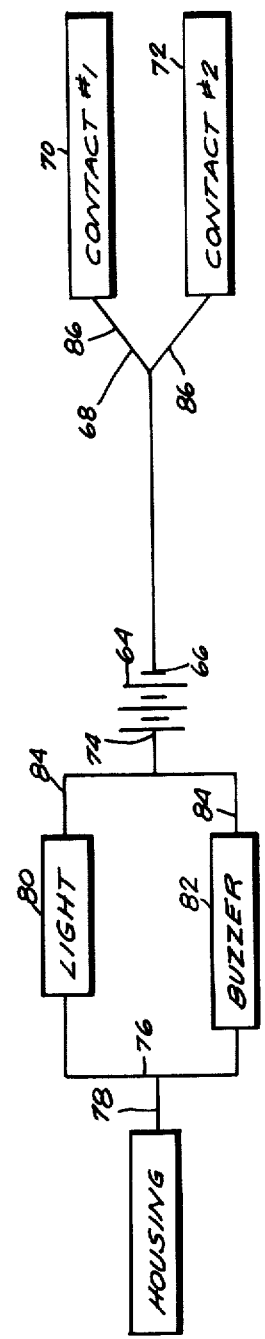
FIG. 3 is a schematic diagram of the device.

Referring now to the block diagram shown in FIG. 3, the device 10 includes a battery 64, e.g. a 9-volt battery such as is commonly used in transistorized portable radios. One terminal, 66, of the battery 64 is connected by wiring 68, in parallel, to each of two terminals 70, 72 which are to be alternatively used in carrying-out aligning processes using the device 10. The other terminal, 74, of the battery 64 is connected by wiring 76 to a terminal 78 (that is connected to the electrically conductive portion of the housing 12). Interposed in the wiring 76 are a light 80 (e.g. covered by a translucent red lens) and a sound-emitter 82 which are wired in parallel with one another. (Thus, each may be provided with a respective on/off switch (not shown) located at 84, in case only an audible signal or only a visible signal is wanted. These switches would be located either within the cavity 56 or on the top of the housing 12. Similarly, the wiring to each of the terminals 70, 72 may be provided with respective switches (not shown) located at 86 in case either needs to be cut-off in order to avoid giving rise to a spurious signal by touching something when it is not being used. The switches 86 likewise would be conveniently located.)

Figure 2:
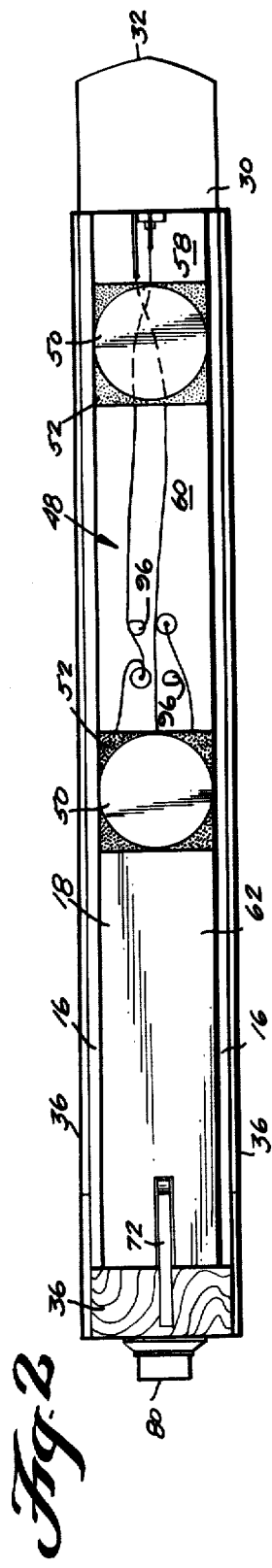
FIG. 2 is a bottom plan view of the device.

Now the locations of the various elements on the preferred embodiment will be more particularly pointed out with reference to FIGS. 1 and 2.

The light 80 is mounted in a socket opening in the insulative rear end wall so that its terminals are exposed within the rear compartment 62 of the cavity. The battery 64 also is mounted within this compartment. The rear terminal 72 is shown provided in the form of a brass rod, flattened on its lower side in a segment that is recessed into the insulative rear end wall so that the lower side of the terminal 72 segment is flush with the lower edges 22. The rear compartment 62 is removably covered with a cover plate 88 that is made of electrically insulative material such as that of the housing covering 38, and held in place by any convenient means, e.g. pieces of adhesive tape 90 and brackets 92.

The sound emitter 82 is a conventional device, e.g. of the sort conventionally used in automobiles for audibly advising an occupant that he or she has neglected or forgotten to fasten his or her seatbelts. In general, when the battery power is applied across the terminals of the sound-emitter 82 it emits a high-pitched buzzer/-squeal/screech type of sound by causing a diaphram 94 to vibrate. The sound emitter 82 is shown centrally mounted upon the exterior of the back of the housing, e.g. by mechanical clips 96 fastened through suitable holes, so as to dispose the terminals of the sound emitter within the intermediate compartment 60 of the housing cavity.

A threaded terminal post 98 having a nut threaded thereon on the back-side of the forward end wall 20 within the forward compartment 58 of the housing cavity is shown constituting the housing terminal 78. It is shown medially located just above the level of the shoe plate 28.

The forward terminal 70 is shown constituted by a set screw 100 threaded forwardly into the plastic nut 49 from behind the fixture 34 so as to have its nose 102 disposed an adjustable distance forwardly of the front surface 104 of the block 42 of electrically insulative material. The terminal 70 is electrically isolated from the housing 12 because the hole 44 is oversize relative to the set screw 100. A lock nut 106 is shown threaded onto the set screw to the front of the block 42. The rear end of the set screw is shown provided with a slot 108 to permit adjustment of the amount of axial extension of the nose 102, an adjustment the lock nut 106 is provided to hold.

Thus, the light 80 will be lit and the audible sound emitter will emit its sound, if any part of the electrically-conductive portion of the housing is touching an electrically-conductive fixed-location portion of the tool that is having its cutters or the like aligned provided that one or the other of the terminals 70, 72 also is touching the cutter or the like assuming, as is generally the case, that there is an electrically conductive path through the tool between the cutter or the like and the aforementioned fixed-location portion of the tool.

The device 10 preferably further includes as an accessory, a probe 110 of electrically conductive material. The probe 110 is elongated, having a tip 112 at its forward end, an internally threaded socket 114 at its rear end and an intermediate bend 116 so that the tip is laterally somewhat out of axial alignment with the base of the probe 110. The probe 110 is designed to be screwed onto the protruding tip of the set screw 100 of the forward terminal 70.

A first typical use of the device 10 is illustrated in FIG. 4. There, the tool that is to have its working means adjusted, is woodworking jointer 140. The tool 140 has a horizontal bedplate 78 with an upstanding rail 60 along the far side. At the near side a slot 118 is shown formed through the bedplate and extending transversally at an intermediate location so as to disappear under the side rail 60. At that point, the underside of the rail is arcuately notched at 120. The slot 118 and notch 120 are provided to accommodate a generally cylindrical cutter head 122 that is journalled to the tool below the bedplate so as to be power-rotatable about a horizontal axis extending transversally of the tool. This rotatable head has conventionally mounted to it at a plurality of equiangularly-spaced locations a respective plurality of longitudinally extending, radially protruding knives 124. In the drawing one of these knives 124 is shown projecting vertically upwards so that its cutting edge 126 lies at or ever-so-slightly above the level of the upper surface of the bedplate. In this example, there are two other identical knives (not shown) located at 120° intervals about the circumference of the head 122.

The tool 140 has conventional means, not shown in detail, for moving the knives relative to the cutter head on which they are mounted, and/or for moving the cutter head/knives assembly as a whole relative to the bedplate, so as to increase, decrease and/or to tilt along its length the locus of intersection of the edges of the cutting blades with the volume of space above the surface of the bedplate over the slot 118.

Juxtaposed with the near end of the cutting head, the device 10 is shown being placed rear end first onto the bedplate of the machine, so that the magnets 50 clamp the device 10 onto the bedplate, subject to intentional lateral adjustment of the position of the device 10 by hand. At this time, the lower edges 22 of the sidewalls 16 of the housing 12 are in physical and electrical contact with the bedplate. Because the bedplate is in electrical contact with the cutting head, if the usual adjustment means for the cutting head, and/or of the cutting blade whose edge is now presented upwards is adjusted so as to move that blade upwards, either along its whole length or at least at the near end, at the moment the near end of the cutting edge is high enough, that portion of the cutting edge will touch the underside of the rear terminal 72, setting off the visual signal of the light 80 and the audible signal of the sound-emitter 82 (assuming that both are turned-on). By manually rotating the cutting head, this same adjustment may be provided for each of the blades or for the near end of each of the blades, so that all are in alignment. If only the near ends of blades have been thus aligned, the device 10 may be picked up and replaced over by the rail, i.e. toward the far end of the blades, and the same adjustment repeated for each blade until all of them are in alignment at that end.

Referring now to FIG. 5, the device 10 is shown being used, exactly in the same manner as in FIG. 4 to align the adjustable knives 128 on the head of a conventional woodworking moulder 130.

A different mode of use of the device 10 is illustrated in FIG. 6, where the tool 132 is a conventional woodworking planer having three knives 134. Here there is no conveniently located essentially planar horizontal bedplate surface conveniently juxtaposed with the length of the cutting head 136. However, the outer circumferential surface of the cutting head 136 is itself smoothly circularly cylindrically curved. Accordingly, the device 10 is stood on its forward end with the axis of curvature of the concave arcuate forward end surfaces of the fixture 34 of the device 10 parallel with the longitudinal axis of the cutting head 136. Accordingly, four points 138 or three points 140 of the fixture 34 engage the cylindrical head 136, with the location of one of the blades 134 straddled, so that the nose 102 of the threaded set screw-type terminal post 100 points right down at a site on the cutting edge of the respective blade 134. Then the set screw 100 and/or the blade can be adjusted so that the cutting edge at that site just touches the nose 102, thus setting-off the visible and audible indicators at 80, 82. Then the device 10 may be slid along the length of the cutting head cylindrical surface and the testing and adjustment repeated until the same light and sound indication is provided along the entire length of that blade. Then the cutting head may be manually rotated to bring up the next blade and the alignment process repeated, and so for each blade.

In this mode, the magnets 50 and the rear terminal 72 are not used.

A further mode of use is illustrated in FIG. 7. Here the machine is a conventional woodworking shaper 142 having a horizontal bedplate 144 up through an opening 146 in which a cutting head 148 vertically projects, for rotation about a vertical axis. The cutting head 148 is provided with a plurality of equiangularly spaced radially outwardly projecting knives 150 having respective vertically extending cutting edges. For this tool, neither the rear terminal 72 nor the forward terminal 70 represented by the nose of the adjustable set screw 100 are conventionally located to contact the cutting edges. Accordingly, the probe 110 is threaded into place, to effectively provide a forward and lateral extension of the forward terminal 70. Starting at the point P and extending to the rear end of the device, the lower edges 22 of the sidewalls 16 are relieved upwards so that if the contact 72 touches a flat electrically conductive surface, the edges 22 where they spacedly flank the contact 72 will not contact that surface and set off a spurious signal. The location of the device 10 is shifted on the bedplate until it is right, and the magnets 50 hold it there, then the cutting head and/or the blades thereon are moved relative to the tip of the probe 112 in order to uniformly produce the audible and visual signalling that is indicative of uniform alignment of the cutting edges.

The probe 110 is subject to angular adjustment so the tip will be angled in the right direction to contact the cutting edge.

Similarly, the device 10 may be used in each of its mode with similar, other tools for providing aligned adjustments in an analogous manner.

It should now be apparent that the knife alignment sensor as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A knife alignment sensor device for aligning one or more adjustably disposed working edges or surfaces provided on a movable working head of a power tool relative to a fixed position site on the power tool where there is an electrically conductive path between each edge or surface that is to be adjusted and the fixed position site, said device comprising:

a housing having a side with planar exteriorly exposed surface means including a first portion of a first electrically conductive contact means covering less than all of said side, and a forward end and a rear end;

said planar exteriorly exposed surface means of said side further including a second electrically conductive contact means adjacent said rear end of said housing and electrically insulative means isolating said first and second electrically conductive contact means;

said housing including means defining a cavity constructed and arranged to contain an electrical power supply battery means having two terminals;

two respective terminal connectors housed within said cavity;

a third electrically conductive contact means is the form of an elongated rod-like member having a base and a tip;

said housing forward end having thereon a forwardly presented second portion of said first electrically conductive contact means;

means mounting the base of the third electrically conductive contact means on the forward end of the housing so as to cantilever the third electrically conductive contact means from the housing to project the tip thereof forwardly of the forward end of the housing;

means electrically isolating the first from the third electrically conductive contact means through the housing;

first electrical conductor means electrically connecting the first electrically conductive contact with one of the two battery terminal connectors;

second electrical conductor means electrically connecting the second and third electrically conductive contacts in parallel with one another to the other of the two battery terminal connectors; and at least one signal-emitting member incorporated in one of said electrical conductor means, so that only when a battery is connected to said two battery terminal connectors, one said portion of the first electrically conductive contact means is engaged with said fixed position site on the power tool, and either of the second and third electrically conductive contact means is engaged with a said working edge or surface of said power tool does said at least one signal-emitting means emit a respective signal.

2. The knife alignment sensor device of claim 1, wherein:

said second portion of said first electrically conductive contact means is constituted by a forwardly concave saddle-like fixture formed on the housing, said fixture being adapted to permit said device to be stood forward-end-down thereupon on said fixed-position site of said power tool.

3. The knife alignment sensor device of claim 1, wherein:

the housing comprises a body portion constituted by a downwardly-opening squared-off U-shaped channel member made of electrically conductive metal so as to have two sidewalls with lower edges, and a top wall.

4. The knife alignment sensor device of claim 2, wherein:

the housing comprises a body portion constituted by a downwardly-opening squared-off U-shaped channel member made of electrically conductive metal so as to have two sidewalls with lower edges, and a top wall;

said saddle-like fixture and said channel member being fabricated together by electrically conductive means.

5. The knife alignment sensor device of claim 4, wherein:

said second electrically conductive contact means comprises a rod having a flat lower side, said rod being disposed medially between said lower edges of said two sidewalls of said body of said housing.

6. The knife alignment sensor device of claim 1, wherein:

said means mounting the base of the third electrically conductive contact means on the forward end of the housing is constructed and arranged with said third electrically conductive contact means to permit axial adjustment of the third electrically conductive contact means relative to the forward end of the housing to permit axial adjustment of said tip.

7. The knife alignment sensor device of claim 6, wherein:

said mounting means comprises an interiorly threaded opening fixed on said forward end and said third electrically conductive contact means comprises an exteriorly threaded rod threadedly received in said interiorly threaded opening.

8. The knife alignment sensor device of claim 7, wherein:

the third electrically conductive contact means further comprises an elongated probe of electrically conductive material having a forwardly presented tip and a rearwardly presented internally threaded socket, said probe being removably screwed onto said exteriorly threaded rod so that the tip of the probe constitutes a substantial forward extension of the tip of the exteriorly threaded rod.

9. The knife alignment sensor device of claim 8, wherein:

the probe includes an obtuse-angle bend between the socket and tip thereof, so that said probe further constitutes a substantial lateral disposition of the tip of said exteriorly threaded rod.

10. The knife alignment sensor device of claim 1, 2, 3, 4, 5, 6, 7, 8 or 9, wherein:

said at least one signal-emitting means is constituted by both an electric light and an electrically-operated audible signal-emitter.

11. The knife alignment sensor device of claim 10, wherein:

the audible signal-emitter is exteriorly exposed on an opposite side of the housing from said side having said planar surface means and said electric light is exteriorly exposed on said rear end of said housing.

* * * * *